United States Patent [19]

Sperl et al.

[11] Patent Number: 5,044,734

[45] Date of Patent: Sep. 3, 1991

[54] ELECTRO-OPTICAL FLAT-DESIGN DISPLAY DEVICE, IN PARTICULAR LCD AREA

[75] Inventors: Herbert Sperl; Frank Mössner; Hartmuth Siefker, all of Berlin, Fed. Rep. of Germany

[73] Assignee: Krone Aktiengesellschaft, Berlin, Fed. Rep. of Germany

[21] Appl. No.: 447,550

[22] Filed: Dec. 7, 1989

[30] Foreign Application Priority Data

Dec. 16, 1988 [DE] Fed. Rep. of Germany ....... 3842900

[51] Int. Cl.[5] .......................... G02F 1/13; F21V 7/04

[52] U.S. Cl. ........................................ 359/49; 359/70; 362/26; 362/31

[58] Field of Search .................. 350/338, 345, 339 D, 350/334; 362/26, 31, 32, 362

[56] References Cited

U.S. PATENT DOCUMENTS

| | | | |
|---|---|---|---|
| 4,043,636 | 8/1977 | Eberhardt et al. | 350/345 |
| 4,126,383 | 11/1978 | Doriguzzi et al. | 350/338 |
| 4,775,222 | 10/1988 | Ohe | 362/26 X |
| 4,822,145 | 4/1989 | Staelin | 350/345 |
| 4,838,661 | 6/1989 | McKee et al. | 350/345 |

FOREIGN PATENT DOCUMENTS

| | | | |
|---|---|---|---|
| 0271956 | 6/1988 | European Pat. Off. . | |
| 2902745 | 8/1980 | Fed. Rep. of Germany . | |
| 3430191 | 3/1985 | Fed. Rep. of Germany . | |
| 2161969 | 1/1986 | United Kingdom | 350/345 |

OTHER PUBLICATIONS

Digital Technology Review, "Fluorescence Activated LCDs May Serve in Low Light Conditions", Computer Design, vol. 16, No. 10, Oct. 1977.

Bush et al., "Liquid Crystal Display Device", IBM, vol. 14, No. 1, Jun. 1971.

*Primary Examiner*—Stanley D. Miller

*Assistant Examiner*—Huy K. Mai

*Attorney, Agent, or Firm*—McGlew & Tuttle

[57] ABSTRACT

The invention relates to an electro-optical flat-design display device, in particular to an LCD area, comprising a flat-design housing 1 having at least one line of display elements 10 forming the front 8 of the housing 1, and comprising a backlighting device disposed inside the housing 1 and assigned to the line of display elements 10. For reducing the heat load of the LCD display elements 10 and for simplifying the construction of the housing 1, it is provided, according to the invention, that the backlighting device includes a light-guide tube 12, 17 disposed inside the housing 1 and a light source 18 disposed at a light entrance opening of the light-guide tube 12, 17, that the light-guide tube 12 is made from transparent material and surrounded by a reflector material 14, and that the reflector material 14 comprises cutouts 15 assigned to the individual display elements 10 and serving as light-exit openings FIG. 2.

12 Claims, 1 Drawing Sheet

ELECTRO-OPTICAL FLAT-DESIGN DISPLAY DEVICE, IN PARTICULAR LCD AREA

FIELD OF THE INVENTION

The invention relates to an electro-optical flat-design display device, in particular to an LCD area display which is preferably backlit.

BACKGROUND OF THE INVENTION

An electro-optical flat-design display device formed as an LCD area of the mentioned species is known in the art from EP No. 0.146.285. Herein, five horizontal lines having several side-by-side display elements each are provided, each of the display elements being built-up by a 5×3 matrix. The five lines of LCD display elements form the front of the housing. Two light sources are installed in the housing extending in the longitudinal direction of the lines, as backlighting devices.

The considerable generation of heat by the light sources within the flat-design housing has been found to be disadvantageous. It is disadvantageous, further, that the two light sources have to be replaced after a certain operating time. For this purpose the individual lines of LCD display elements are arranged in a hinged manner on the front side of the housing, in order that the light sources provided with a reflector on the rear side of the housing can be replaced from the front of the housing.

It is also disadvantageous that the LCD display elements are continuously exposed to u.v. and heat irradiation. This will lead to degregation, disintegration and destruction of the dye pigments inside the LCD display elements, such that these have to be replaced after a certain operating time. Further, there is a disadvantage in that electrical installation equipment has to be assigned to the light sources inside the housing or on its rear side such electrical equipment also generates heat and is heavy in weight. Finally, another disadvantage resides in the necessitated hinged arrangement of the LCD display element, dust is capable of entering through a plurality of housing openings, such that the dust deposits both on the light sources and on the inner sides of the LCD display element thereby, causing a premature damping of light.

SUMMARY AND OBJECT OF THE INVENTION

It is an object of the invention to improve an electro-optical flat-design display, in particular an LCD area, of the abovementioned type such that the backlighting device is considerably simplified, in order to obtain a more compact flat-design display device, the display elements of which are affected neither by u.v. nor by heat irradiation nor by dust ingress, and which is particularly maintenance-friendly.

According to the invention, backlighting of the display elements, in particular of the LCD display elements, is effected by a light-guide tube disposed inside the housing, the light source of which is disposed at one end of the light-guide tube, in particular outside the housing. The light-guide tube is made from transparent material and is surrounded by a reflector, such that the total light irradiation generated by the light source is continuously reflected inside the light-guide tube and can emerge only through the cutouts of the reflector immediately in the area of the individual display elements. By this arrangement complete usage is made of the light radiation of the light source. Additionally, there is no u.v. or heat irradiation load of the display elements, in particular LCD display elements. Further, replacing the components disposed inside the housing in the area of the display elements is no longer necessary, such that the individual display elements can be fixed to the front side of the housing. The housing can, thereby, be encapsulated in a dust-tight manner. Further, there is no need for electrical equipment inside the housing. Even blower equipment is not required anymore.

In another embodiment of the invention, the light source is disposed at the end of the light-guide tube disposed outside the housing and there are mounted heat and color filters in front of the light source. This arrangement improves both the ease of maintenance of the flat-design display device, and reduces the heat irradiation on the display elements in the housing.

Further, for an arrangement of several lines of LCD display elements having assigned each a light-guide tube, there can be disposed electronic components in the free spaces formed therebetween for controlling the LCD display elements Light-guide tubes are per se known in the art from DE Pat. No. 34 30 191. They serve, however, exclusively as lighting bodies for room lighting purposes. According to the invention, the usage of such light-guide tubes is provided for electro-optical flat-design display devices, in particular for LCD areas.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DETAILED DESCRIPTION OF THE PREFERRED EMBODIMENT

Figure 1:
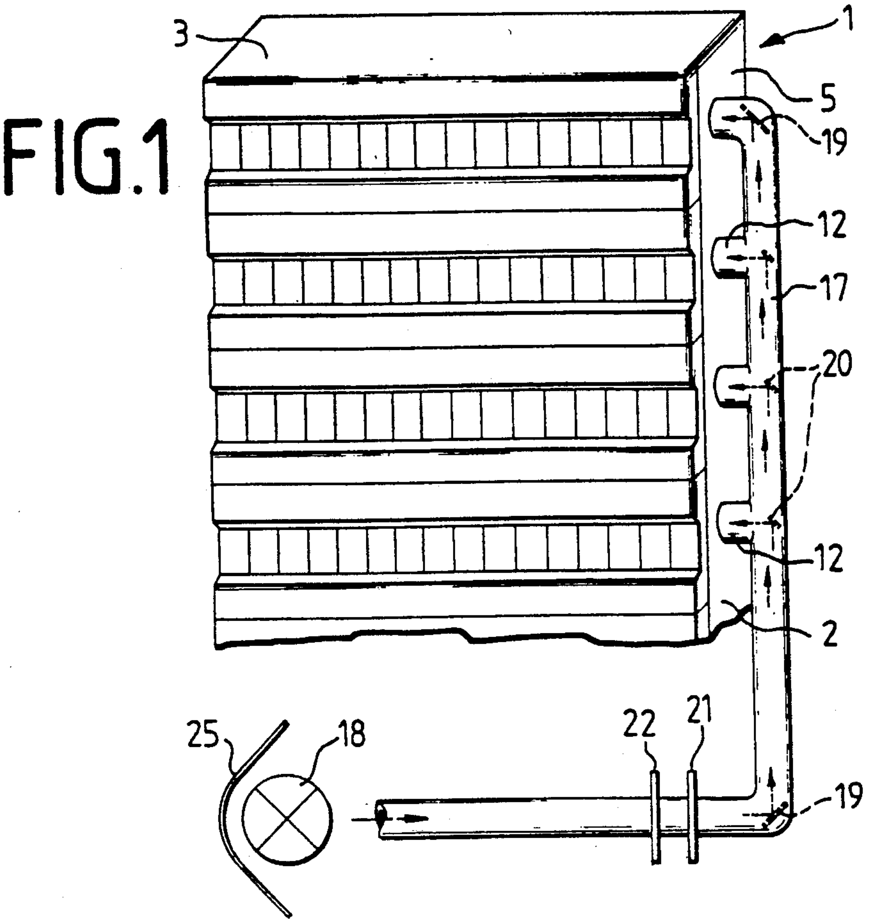
FIG. 1 is a perspective representation of an LCD area according to the invention and, FIG. 2 is a perspective cross-sectional view of an LCD display according to the invention.
Figure 2:
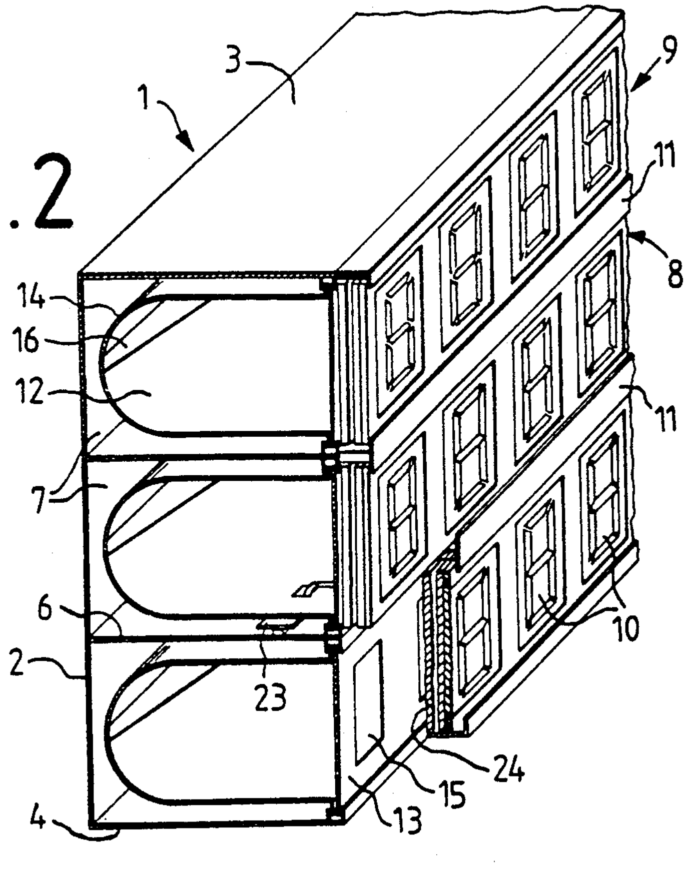

Referring to the drawings in particular the LCD area consists of a flat-design housing 1 with rear wall 2, top wall 3, bottom wall 4, side walls 5 and with intermediate walls 6 extending between the side walls 5 in parallel to the top wall 3 and the bottom wall 4 and forming individual chambers 7. The front side 8 of the housing is substantially formed by rows 9 of LCD display elements 10, which, in the embodiment shown, are formed as known-in-the-art 7-segment display elements. Instead of the 7-segment elements, 3×5 matrix elements or the like can also be employed. The construction of such LCD elements is described in more detail in EP No. 0.146.285. The LCD elements 10 are received by profiled sections 11 extending on the front side 8, the profiled sections 11 being fixed to the top wall 3 and to the bottom wall 4 as well as to the intermediate walls 6. The electronic components 23 assigned to the individual LCD elements 10 are mounted on the intermediate walls 6. On the inner side diffuser disks 24 are assigned to the LCD elements 10. The total housing 1 is encapsulated in dust-tight manner.

Within the individual chambers 7 of the housing 1, light-guide tubes 12 are disposed, which, in the embodiment shown, are U-shaped, the open side of the U-shape being formed by a strip-type wall 13. The light-guide U-shaped tubes 12 and the strip-type walls 13 are surrounded by reflector material 14. In the area of the LCD elements 10 the material 14 is provided with cutouts 15 which serve as light-exit openings and correspond in their area dimensions accurately to those of the LCD elements 10 to be lighted and being assigned thereto. Within the light-guide tubes 12, in the curved rear section of the U-shape, concentrators 16 are supported. The concentrators 16 direct the light, which has been reflected in the light-guide tubes 12, in the direction of the opposed cutouts 15 of the reflector material 14.

Each light-guide tube 12 is connected to a light-guide tube 17 arranged outside the housing 1. The light-guide tube 17 comprises at its one end a light source 18 directing its total light radiation by means of a suitable reflector 25 into the light-guide tube 17. At the bendings of the light-guide tube 17 and at the entrance locations of the light-guide tubes 12, deflector mirrors 19, 20 are disposed, the deflector mirror 19 deflecting the total light radiation and the deflector mirrors 20 deflecting each part only of the radiation into the respective light-guide tubes 17 or 12, respectively. Finally, a heat filter 21 formed as a glass disk and a color filter 22 are mounted in front of the light source 18. The color filter 22 is formed as an electrically controllable, doubly refracting color filter using liquid crystal technology (ECB-LC filter).

The light radiation emerging from the light source 18 passes through color filter 22 and through heat filter 21 and is guided totally over the light-guide tube 17 and the deflector mirrors 19, 20 into the individual light-guide tubes 12. Here, continuous total reflection of the entering light radiation is effected at the walls of the light-guide tubes 12, including the flat walls 13 assigned to the light-guide tubes 12. At the end opposite to the light source 18, (at an end of each light-guide tube 12), additional mirrors are arranged (not shown) for a substantially loss-free reflection of the light radiation. The light radiation being, thus, continuously reflected inside the light-guide tubes 12 can only exit through the light exit openings 15 assigned to the respective LCD elements 10. By means of the concentrators 16, the intensity of the light radiation emerging here is further increased.

As material for the light-guide tube 12 and for the wall 13 limiting the latter, a per se known reflector foil is employed. In particularly advantageous manner, a reflector foil is employed, which is described in more detail in DE Pat. No. 34 30 191 A1 following the example of a lighting body having prismatic light guiding for room illumination. Herein, a special shape of the outside contour of the light-guide foil serves for total reflection of the light radiation inside the light-guide tube 12, an exit of the radiation being only possible within the cutouts 15.

While a specific embodiment of the invention has been shown and described in detail to illustrate the application of the principles of the invention it will be understood that the invention may be embodied otherwise without departing from such principles.

What is claimed is:

1. An electro-optical flat-design display device, particularly with an LCD display area, comprising: a substantially flat housing having a plurality of rows of display elements forming the front of the housing; a back-lighting device disposed inside said housing and assigned to the rows of display elements, the backlighting device including a light-guide tube for each of said rows of display elements, each said light guide tube being disposed inside the housing, each said light-guide tube being connected to a light-guide transmission tube including a light entrance opening, each said light-guide tube being formed of transparent material and being surrounded by a reflective material, said reflective material including cutouts defining a light exit opening, each cutout substantially coinciding with individual display elements and a light source positioned adjacent said light entrance opening.

2. An electro-optical flat-design display device according to claim 1, wherein said light source is disposed at an end of the light-guide tube, said end of the light-guide tube being disposed outside of said housing.

3. An electro-optical flat-design display device according to claim 1, wherein a heat filter and a color filter are associated with the light source, positioned between the light source and the cutouts.

4. An electro-optical flat-design display device according to claim 3, wherein said heat filter is formed of a glass disk.

5. An electro-optical flat-design display device according to claim 3, wherein said color filter is composed of an electrically controllable, double refracting color filter employing liquid crystal technology (ECB-LC filter).

6. An electro-optical flat-design display device according to claim 1, wherein each row of said plurality of rows is assigned a light-guide tube disposed inside said housing, electrical components associated with said LDC display elements being disposed between the light-guide tubes.

7. An electro-optical display device, comprising: a housing supporting plural rows of LCD display elements; a light-guide tube formed of transparent material, said light-guide tube being surrounded by reflective material and having an end defining a light entrance opening, said light-guide tube including light-guide tube branches extending into said housing, each light guide tube branch of said light-guide tube branches being positioned adjacent a corresponding row of said plural rows of LCD display elements, said reflective material having cutoffs positioned adjacent said display elements to form light exit openings backlighting said display elements; and a light source positioned adjacent said light entrance.

8. An electro-optical display device according to claim 7, wherein said light-guide tube includes a light transmission tube positioned between said light entrance opening and each branch of said light-guide tube branches, said transmission tube including openings connecting said transmission tube to each of said branches at locations along said transmission tube, each of said locations including a deflector mirror positioned to deflect at least a part of radiation into a corresponding branch of said light-guide tube.

9. An electro-optical display device according to claim 8, wherein said transmission tube includes a heat filter and a color filter to condition radiation from said light source.

10. An electro-optical display device according to claim 8, wherein said housing is formed as a substantially flat structure having a depth which is much smaller than its width and height, each of said light-guide tube branches include a substantially u-shaped element with a strip-type wall positioned between said u-shaped element and a corresponding row of said plural rows of LCD display elements, said cut-outs being formed in said strip-type wall.

11. An electro-optical display device, comprising: a housing including a rear housing wall, a top horizontal wall and a bottom horizontal wall, a horizontal intermediate wall dividing said housing into a first display area and a second display area; a row of liquid crystal display elements, each element being spaced along the length of said housing; another row of liquid crystal display elements, each display element being spaced along the width of said housing, said first row of liquid crystal display elements being positioned in front of said first display area and said second row of liquid crystal display elements being positioned in front of said second display area; u-shaped elements positioned in each of said display area, each of said u-shaped elements having an open end facing one of said rows of liquid crystal display elements, each of said u-shaped elements having a reflective surface directed inwardly; a strip wall member positioned in front each of said u-shaped elements, said strip wall member including cut-outs aligned with each display element of said row of liquid crystal display elements; a light-guide transmission tube including light-guide branches connected to each of said u-shaped members, said light-guide transmission tube being formed of transparent material and being surrounded by reflective material and having an end defining a light entrance opening; deflector mirrors positioned adjacent each of said light-guide branch tubes for deflecting a portion of radiation into a corresponding light-guide tube branch; and a light source position adjacent said light entrance.

12. An electro-optical display device according to claim 11 further comprising a heat filter and a color filter positioned between said light source and said cut-outs.

* * * * *